Jan. 13, 1953　　　　　G. E. DUNN　　　　　2,625,018

UNIVERSAL JOINT

Filed Aug. 7, 1951

INVENTOR.
George E. Dunn.
BY
E. J. Balluff
ATTORNEY.

Patented Jan. 13, 1953

2,625,018

UNITED STATES PATENT OFFICE 2,625,018

UNIVERSAL JOINT

George E. Dunn, Dearborn, Mich., assignor to Universal Products Company, Inc., Dearborn, Mich., a corporation of Delaware Application August 7, 1951, Serial No. 240,617

14 Claims. (Cl. 64—7)

This invention relates to universal joints and has particular reference to a joint construction suitable for use on automotive vehicles and the like. More particularly, the invention has reference to certain new and useful improvements in cross type joints whereby the angular displacement is reduced to one-half of that of the usual cross type joint.

A principal object of the invention is to provide a new and improved universal joint construction.

Another object of the invention is to provide a new and improved universal joint construction of the scissors cross type.

Another object of the invention is to provide a cross type joint incorporating provisions for reducing the angular displacement to one-half of that encountered in the usual cross type joint.

Other and further objects of the invention will be apparent from the following description and claims and may be understood by reference to the accompanying drawing, of which there is one sheet, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawing:

Fig. 4 is a perspective view of one of the driving pins of Figs. 1 and 2 showing a modified type of bearing which may be used therewith.

Figure 1:
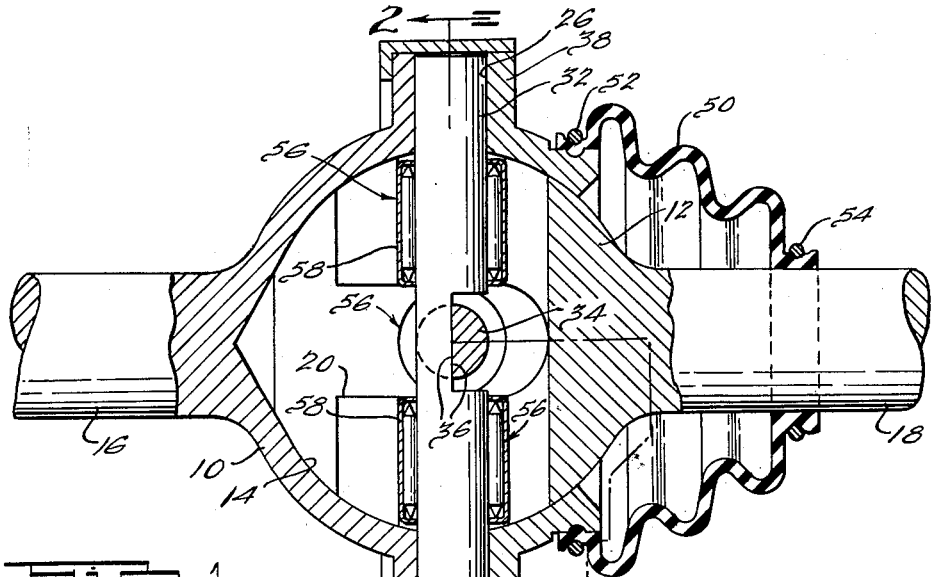
Fig. 1 is a longitudinal sectional view of a universal joint embodying my invention.

As illustrated in the embodiment of the invention selected for purposes of illustration, a universal joint embodying my invention comprises in general driving and driven members, one of which comprises a socket member 10 and the other of which comprises a spherical ball head 12 swiveled in the spherical socket 14 provided by the socket member 10. The members 10 and 12 are carried by shafts 16 and 18. The ball head 12 is provided with a pair of intersecting, axially extending, diametral slots 20 and 22 disposed at right angles to each other and to the axis of rotation of the ball head 12, it being understood that the ball head 12 rotates about the axis of the shaft 18 while the socket member 10 rotates about the axis of the shaft 16 regardless of the relative angular positions of the shafts 16 and 18.

The socket member 10 is provided with a series of radially extending slots 24, 26, 28, and 30 in the peripheral flange thereof, the slots 26 and 30 being in line and the slots 24 and 28 being in line, and the slots 24 and 28 being disposed at right angles to the slots 26 and 30.

A drive or cross pin 32 extends through the slot 22 in the ball head and its ends project into the slots 26 and 30 in the socket member, while a second pin 34 extends through the other slot 20 in the ball head and its ends project into the slots 24 and 28 in the socket member. The pins 32 and 34 are arranged crosswise of each other, and each of the pins is notched at its middle, as indicated at 36, so as to accommodate the other of the pins, and the notched portions of the pins are seated against each other so that the pins lie in a common plane.

From Fig. 1 it will be observed that the socket member 10 is completed by a cap or cover 38, the peripheral edge of which fits within a housing cover ring 40 which may be press fitted over the projecting annular flange 42 formed integrally with the socket member 10. The slots 24, 26, 28 and 30 are wholly formed within the flange 42, and the open side thereof is closed by the flange 44 of the cover 38. A series of bolts 46 extending through holes in the flange 44 is threaded into threaded holes in the flange 42 for securing the cover 38 in the assembled relation as shown with the member 10, the heads of the bolts 46 overlapping the edges of the holes in the cover 38 through which the bolts extend.

A boot 50 formed of suitable flexible material, such as rubber, plastic, or the like, is secured to the cover 38 by a ring 52 and to the shaft 18 by a ring 54 which serves to retain lubricant within the joint and to exclude dirt therefrom. The housing cover ring 40 engages the ends of the cross pins 32 and 34 for centering the same in the joint and closes the ends of the slots 24, 26, 28 and 30, the ends of the pins 32 and 34 being provided with a spherical surface, the center of which is the center of the pin.

The width of the slots 24, 26, 28 and 30 in the socket member 10 transversely of the axis thereof is greater than the size or diameter of the projecting ends of the pins 32 and 34 so as to permit limited angular movement of the ends of such pins relative to the socket member, thereby to permit scissoring action of said pins during rotation of the joint when the driving and driven members are angularly disposed relative to each other.

The axial length of the slots 20 and 22 in the ball head 12 is greater than the size or diameter of the pins 32 and 34 which are positioned by the socket member intermediate the axial length of the slots 20 and 22 so that each pin is free to rock in its respective slot about the axis or center line of the other pin.

Each end of each of the cross pins 32 and 34 is journalled in a needle roller bearing assembly indicated generally at 56, the cages 58 of which are slidable in the slots 20 and 22 so as to provide needle roller bearings operatively disposed in torque transmitting relation between the cross pins 32 and 34 and the bifurcations of the ball head 12 formed by the slots 20 and 22 thereof. While the use of needle rollers is desirable in joints of the caliber required for use in automotive vehicles, it is possible that for some applications the needle roller bearings 56 may be dispensed with, in which event the width of the slots 20 and 22 would be of such size so as to have a close working fit with the cross pins 32 and 34.

The sides 60 and 62 of each of the slots 24, 26, 28 and 30 form driving faces or surfaces which are engaged by the pins 32 and 34, depending upon the direction of the drive between the parts 10 and 12, and accordingly, these faces or surfaces are disposed parallel to a line extending radially from the axis of rotation of the socket member 10 so that the full length of the projecting ends of the pins 32 and 34 will bear against the full length of the faces 60 or 62, as the case may be.

In addition compensating springs 64 are arranged in torque transmitting relation between the ends of the pins 32 and 34 and the socket member, the socket member for this purpose being provided with two spring seats 66 in the form of pins extending across bores 68 which intersect the slots 24, 26, 28 and 30 so that springs 64 may be confined between each side of the projecting end of a cross pin and the socket member. The springs are relatively heavy, and when assembled are compressed between the pins and the socket member. The springs may be sufficiently heavy to transmit the driving torque between the ball head 12 and the socket member 10 under relatively light loads, although the springs will yield during the scissoring action of the pins.

It will be observed that the socket member 10 and the cross pins 32 and 34 are constructed and arranged relative to each other so that the pins 32 and 34 must rotate with the socket member and in a plane normal to the axis of rotation thereof. The center lines of the pins 32 and 34 intersect at the intersection of the axis of rotation of the members 10 and 12 and which intersection is also the center about which the ball head 12 swivels in the socket 14.

In operation, assuming the shafts 16 and 18 to be angularly disposed relative to each other, the pins 32 and 34 will alternately transmit the driving torque between the members 10 and 12, each pin being operative to drive through 90° of rotation at a time due to the scissoring action of the pins during the rotation of the joint. The springs 64 function to cushion the engagement of the pins 32 with the driving faces 60 and 62, depending upon the direction of drive. Since the pins alternately transmit the torque through 90° of rotation, the angular displacement will be only half of that occurring in the conventional cross type of joint.

Figure 3:
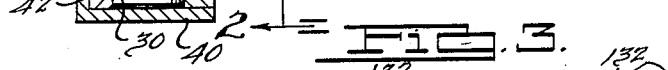
Fig. 3 is a perspective view showing a modified form of the driving pins of the joint.
Figure 2:
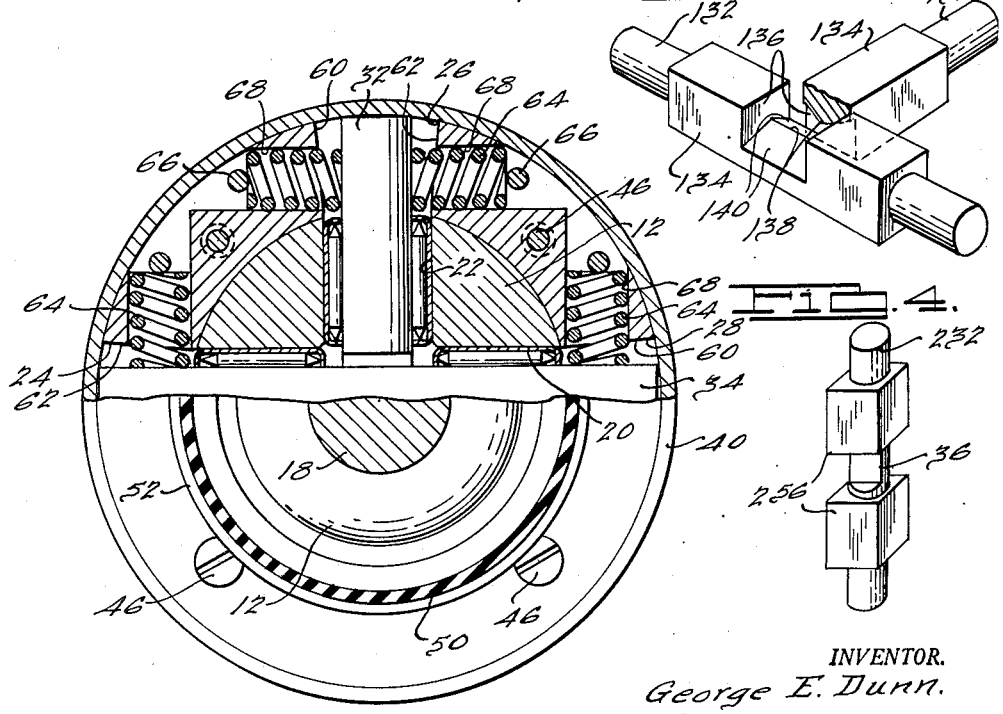
Fig. 2 is a view taken along the staggered line 2—2 of Fig. 1, looking in the direction of the arrows, and showing half of the joint in section through the driving pins.

In Fig. 3 there is disclosed a pair of driving pins 132 of a somewhat different type than the pins 32 of Figs. 1 and 2. In this modification, the needle roller bearings 56 are dispensed with and the pins 132 formed of square or rectangular cross section except for the ends thereof which project into the slots 24, 26, 28 and 30 in the socket member 10. The central portion 134 of each pin 132 is of the same width as the diametral slots 20 and 22 in the ball head 12 and has a close sliding fit in one of such slots. The pins 132 are notched at their centers as shown, the notches 136 being formed so that each pin 132 has an edge 138 coincident with its center line. The pins 132 are arranged crosswise of each other with the edges 138 in contact so that the pins lie in a common plane. The rectangular portions 134 of pins 132 provide a surface to surface contact between each pin and the sides of the slot in the ball head in which it is arranged instead of the line contact provided by a round pin or needle bearing as shown in Figs. 1 and 2. This type of pin may be desirable in certain applications of the principles of this invention. The angularity of the surfaces 140 of the notches 136 which merge into edges 138 permits each pin to rock in its slot in the ball head about the axis of the other pin, as in Figs. 1 and 2.

Fig. 4 discloses a modified type of bearing which may be used with the pins 32 of Figs. 1 and 2. In this modification the pins 232 are rotatable in bearing blocks 256 instead of the needle bearings 56 of Figs. 1 and 2. The bearing blocks 256 are square or rectangular in cross section as shown so as to provide surface to surface contact between each bearing block and the sides of the slot in the ball head in which it is arranged. Pins 232 are provided with notches 236 similar to notches 36 in Figs. 1 and 2 to permit rotation of each pin in its bearing blocks 256 about the axis of the other pin.

The construction of a universal joint in which the driving pins of Figs. 3 and 4 may be used is the same as that disclosed in Figs. 1 and 2, and the action of such pins and operation of the joint in which they are used is the same as that previously described in connection with Figs. 1 and 2.

While I have illustrated and described preferred embodiments of my invention, it is understood that these are capable of modification and I therefore do not wish to be limited to the precise details set forth but desire to avail myself of such changes and alterations as fall within the purview of the following claims.

I claim:

1. Universal joint construction comprising driving and driven members of which one comprises a socket member and the other a ball head swiveled in said socket member, said ball head having a pair of intersecting, axially extending, diametral cross slots therein, said socket member having a series of slots therein, a pin extending through one of said slots in said ball head and having its ends projecting into certain of said slots in said socket member, a second pin extending through the other of said slots in said ball head and having its ends projecting into other slots in said socket member, said pins being arranged crosswise of each other and in a common plane, the width of said slots in said socket member, transversely of the axis of rotation of said socket member, being greater than the size of the projecting ends of said pins so as to permit limited angular movement of the ends of said pins relative to said socket member thereby to permit scissoring action of said pins during rotation of the joint when the driving and driven members are disposed for rotation on different axes, the axial length of said slots in said ball head being greater than the size of said pins so as to permit rocking movement of each pin in its respective slot in said ball head about the center line of the other pin, springs arranged in torque transmitting relation between said pins and said socket member, said socket member and pins being constructed and arranged relative to each other so that said pins rotate with said socket member in a plane normal to the axis of rotation thereof, the center lines of said pins intersecting at the intersection of the axes of rotation of said driving and driven members.

2. Universal joint construction comprising driving and driven members of which one comprises a socket member and the other a ball head swiveled in said socket member, said ball head having a pair of intersecting, axially extending, diametral slots therein disposed at right angles to each other and to the axis of rotation of said ball head, said socket member having a series of slots therein, a pin extending through one of said slots in said ball head and having its ends projecting into certain of said slots in said socket member, a second pin extending through the other of said slots in said ball head and having its ends projecting into other slots in said socket member, said pins being arranged crosswise of each other and each of said pins being notched at its middle so as to accommodate the other of said pins and said notched portions of said pins being seated against each other so that said pins lie in a common plane, the width of said slots in said socket member, transversely of the axis of said socket member, being greater than the size of the projecting ends of said pins so as to permit limited angular movement of the ends of said pins relative to said socket member, the axial length of said slots in said ball head being greater than the size of said pins so as to permit rocking movement of each pin in its respective slot in said ball head about the other pin and scissoring action of said pins, and a spring interposed between each of the ends of each pin and each of the respective adjacent sides of said slots in said socket member.

3. Universal joint construction according to claim 2 including lubricant sealing and dirt excluding means operatively disposed between said socket member and ball head.

4. Universal joint construction comprising driving and driven members of which one comprises a socket member and the other a ball head swiveled in said socket member, said ball head having a pair of intersecting, axially extending, diametral cross slots therein, said socket member having a series of slots therein, a cross pin extending through one of said slots in said ball head and having its ends projecting into certain of said slots in said socket member, a second cross pin extending through the other of said slots in said ball head and having its ends projecting into other slots in said socket member, said pins being arranged crosswise of each other and in a common plane, the width of said slots in said socket member, transversely of the axis of said socket member, being greater than the size of the projecting ends of said pins so as to permit limited angular movement of the ends of said pins relative to said socket member, the axial length of said slots in said ball head being greater than the size of said pins so as to permit rocking movement of each pin in its respective slot in said ball head about the center line of the other pin and scissoring action of said pins when said driving and driven members are disposed for rotation on different axes.

5. Universal joint construction according to claim 4 including needle bearings operatively disposed between said pins and said ball head.

6. Universal joint construction comprising driving and driven members of which one comprises a socket member and the other a ball head swiveled in said socket member, said ball head having a pair of intersecting, axially extending, diametral slots therein disposed at right angles to each other and to the axis of rotation of said ball head, said socket member having a series of slots therein, a pin extending through one of said slots in said ball head and having its ends projecting into certain of said slots in said socket member, a second pin extending through the other of said slots in said ball head and having its ends projecting into other slots in said socket member, said pins being arranged crosswise of each other in a common plane, the width of said slots in said socket member, transversely of the axis of said socket member, being greater than the size of the projecting ends of said pins so as to permit limited angular movement of the ends of said pins relative to said socket member, the axial length of said slots in said ball head being greater than the size of said pins so as to permit rocking movement of each pin in its respective slot in said ball head about the axis of the other pin, and springs arranged in torque transmitting relation between said pins and said socket member.

7. Universal joint construction according to claim 6 wherein each slot in said socket member is provided with a pair of spring seats and wherein said springs comprise a coil spring on each seat arranged to bear against one end of a pin.

8. Universal joint construction comprising driving and driven members of which one comprises a socket member and the other a ball head swiveled in said socket member, said ball head having axially extending diametral cross slots therein, said socket member having radially extending slots in the periphery thereof, a pin extending through one of said slots in said ball head and having each of its ends projecting into one of said slots in said socket member, a second pin extending through the other of said slots in said ball head and having each of its ends projecting into one of said slots in said socket member, the width of said slots in said socket member, transversely of the axis of said socket member, being greater than the size of the projecting ends of said pins so as to permit limited angular movement of the ends of the pins relative to said socket member thereby to permit scissoring action of said pins during rotation of the joint when the driving and driven members thereof are disposed for rotation on different axes, springs arranged in torque transmitting relation between the projecting ends of said pins and said socket member, said pins being disposed in a common plane crosswise of each other, and each of said pins being free to rock in its respective slot in the ball head about the center line of the other pin.

9. Universal joint construction comprising driving and driven members of which one comprises a socket member and the other a ball head swivelled in said socket member, said ball head having axially extending diametral cross slots therein, said socket member having radially extending slots in the periphery thereof, a pin extending through one of said slots in said ball head and having each of its ends projecting into one of said slots in said socket member, a second pin extending through the other of said slots in said ball head and having each of its ends projecting into one of said slots in said socket member, the width of said slots in said socket member, transversely of the axis of said socket member, being greater than the size of the projecting ends of said pins so as to permit limited angular movement of the ends of said pins relative to said socket member, said pins being disposed in a common plane crosswise of each other and normal to the axis of rotation of said socket member, and each of said pins being free to rock in its respective slot in the ball head about the center line of the other pin.

10. Universal joint construction comprising driving and driven members, means providing a swivel connection between said members, said driving member having axially extending diametral cross slots therein, and said driven member having radially extending slots therein, a pin extending through one of said slots in said driving member and having each of its ends projecting into one of said slots in said driven member, a second pin extending through the other of said slots in said driving member and having each of its ends projecting into one of said slots in said driven member, the width of said slots in said driven member, transversely of the axis of rotation of said driven member, being greater than the size of the projecting ends of said pins so as to permit limited angular movement of the ends of said pins relative to said driven member, said pins being disposed in a common plane crosswise of each other and normal to the axis of rotation of said driven member, and each of said pins being free to rock in its respective slot in said driving member about the center line of the other pin thereby to permit scissoring action of said pins during rotation of the joint when the driving and driven members thereof are rotating about different axes.

11. Universal joint construction according to claim 10 wherein compensating springs are arranged in torque transmitting relation between the projecting ends of said pins and said driven member.

12. Universal joint construction according to claim 10 including bearings arranged in said slots in said ball head and through which said pins extend, said bearings having a surface to surface contact with the sides of their respective slots.

13. Universal joint construction according to claim 10 wherein the portions of said pins which are disposed in said slots in said ball head are provided with flat surfaces in engagement with the opposing sides of their respective slots.

14. Universal joint construction according to claim 10 wherein each of said pins is formed to provide a surface to surface contact with the opposing sides of a slot in said ball head, each of said pins being notched at its middle so as to accommodate the other of said pins, said notched portion of each pin having angularly disposed surfaces meeting in an edge coincident with its center line.

GEORGE E. DUNN.

No references cited.